United States Patent [19]

McGuiggan et al.

[11] Patent Number: 4,496,530
[45] Date of Patent: Jan. 29, 1985

[54] PROCESS FOR THE PRODUCTION OF HYDROGEN AND CARBONYL SULFIDE FROM HYDROGEN SULFIDE AND CARBON MONOXIDE USING A METAL INTERCALATE OF GRAPHITE AS A CATALYST

[75] Inventors: Michael F. McGuiggan, Shaker Heights; Philip L. Kuch, Aurora, both of Ohio

[73] Assignee: The Standard Oil Company, Cleveland, Ohio

[21] Appl. No.: 448,581

[22] Filed: Dec. 10, 1982

[51] Int. Cl.$^3$ .......................... C01B 31/26; C01B 3/04
[52] U.S. Cl. .................................. 423/416; 423/648 R
[58] Field of Search ............... 423/415 R, 416, 548 R

[56] References Cited

U.S. PATENT DOCUMENTS 3,847,963 11/1974 Lalancette ...................... 508/185 X
3,856,925 12/1974 Kodera et al. ...................... 423/416

Primary Examiner—Earl C. Thomas
Attorney, Agent, or Firm—Teresan W. Gilbert; Joseph G. Curatolo; Larry W. Evans

[57] ABSTRACT

Hydrogen and carbonyl sulfide are produced by a process comprising contacting gaseous hydrogen sulfide with gaseous carbon monoxide in the presence of a metal intercalate of graphite catalyst, e.g. cobalt Graphimet$^{(R)}$.

20 Claims, No Drawings

PROCESS FOR THE PRODUCTION OF HYDROGEN AND CARBONYL SULFIDE FROM HYDROGEN SULFIDE AND CARBON MONOXIDE USING A METAL INTERCALATE OF GRAPHITE AS A CATALYST

BACKGROUND OF THE INVENTION

1. Field of the Invention

This invention relates to the production of hydrogen. In one aspect, the invention relates to the production of hydrogen from the reaction of hydrogen sulfide and carbon monoxide while in another aspect, the invention relates to conducting this reaction in the presence of a catalyst comprising a metal intercalate of graphite.

2. Description of the Prior Art

Hydrogen is a valuable resource as both a fuel source and chemical feedstock and as such, its production has received much attention from the chemical industry. Presently, the dominant industrial method of production is the reaction of steam with natural gas (steam reforming) although various other methods are known. Of these other methods, one that is of particular interest is the oxidation of hydrogen sulfide with carbon monoxide to produce hydrogen and carbonyl sulfide.

This reaction is of particular interest for several reasons, one of which is that hydrogen sulfide is a relatively inexpensive material and is available in large quantities from the desulfurization of fossil fuels and sour natural gas deposits. Presently this material is considered more of a waste problem than a feedstock and is typically oxidized by the Claus process to water and elemental sulfur.

Another reason for the interest in this reaction is that it can be combined with other reactions to form various thermochemical cycles, such as

| | | | | | |
|---|---|---|---|---|---|
| $H_2S$ | + | $CO \rightleftharpoons H_2$ | + | $COS$ | (a) |
| $COS$ | + | $O_2 \rightarrow CO$ | + | $SO_2$ | (b) |
| $H_2S$ | + | $O_2 \rightarrow H_2$ | + | $SO_2$ | (c) |

The second step, which enables the recycle of relatively expensive carbon monoxide, makes this thermochemical cycle economically attractive. In effect, hydrogen sulfide is combusted to hydrogen and sulfur dioxide, the latter being a useful resource in the manufacture of sulfuric acid.

While the reaction of hydrogen sulfide and carbon monoxide to produce hydrogen and carbonyl sulfide is known, few catalysts have been identified as useful for promoting it. Fukuda et al. describe in several publications the use of various metal sulfides, e.g. titanium disulfide, zinc sulfide, copper sulfide, nickel sulfide, etc. See U.S. Pat. No. 3,856,925; Journal of Catalysis, 49, 379 (1977); and Bulletin of Chemistry for Japan, 51, 150 (1979). However, since these disclosures describe relatively few catalysts, there is a continuing interest in identifying new catalysts for this reaction.

SUMMARY OF THE INVENTION

According to this invention, hydrogen and carbonyl sulfide are produced by a process comprising contacting gaseous hydrogen sulfide with gaseous carbon monoxide in the presence of a catalytic amount of an intercalate of the formula:

$$M_aC_{100-a} \quad (1)$$

where

M is at least one of Co, Fe, Ni, Pd, Cu, Mo, W, V, Nb, Ta, Ru, Os, Rh, Ir and Ti;

C is graphite; and a represents the weight percent of M present in the intercalate and has a value between about 0.1 and 30.

The use of these catalysts in this process results in good conversion of the reactants and desirable product selectivity.

DETAILED DESCRIPTION OF THE INVENTION

Catalysts

The catalytic compositions here used are metal intercalates of graphite, i.e. compounds wherein the metal(s) M is contained within the lamellar graphite structure. These compounds are both known in the art (see U.S. Pat. No. 3,847,963) and are commercially available.

As is represented by formula I, these materials are relatively simple componds comprising one or more metals M and graphite. Preferably, M is at least one of Pd, Co, Ni, Cu and Fe and more preferably at least one of Pd, Co and Ni. Preferably, M comprises (i.e. a is a value of) by weight at least about 2 to about 20 percent of the intercalate (M+graphite).

As is represented by formula I, M can be a combination of two or more elements, e.g. M can be a combination of cobalt and iron. In such instances, the subscript value represents the sum of the elements (e.g. for M, the sum of the subscript values for cobalt and iron is a number of about 0.1 to about 20).

The intercalates of formula I can be used either in the 100 percent active form or in a diluted form and can be either supported or unsupported. Suitable support materials include silica, titania, alumina, silica-alumina, zirconia, silicon carbide, thorium oxide, various phosphates, etc., with the aluminas and silica-aluminas preferred. If a support is used, the catalytic composition (intercalate) is generally present in an amount of at least about one weight percent, based on the combined weight of the support and the catalytic composition, preferably in an amount of at least about 10 weight percent.

Although the intercalates here used are available commercially, if desired they can be prepared by any one of a number of different methods. A typical method of preparation involves dissolving the appropriate metal in the form of its nitrate, carbonate, chloride, acetate, etc. (essentially any anion that is removable by calcination) in some suitable solvent (aqueous, nonaqueous or a mixture of both) and then adding this solution to graphite. The graphite intercalate precursor is then dried to remove the solvent and the dried intercalate precursor is exposed to hydrogen at high temperature (typically greater than about 400° C.) to reduce the metal salt to the corresponding metal in its zero oxidation state.

After the intercalate has been dried, typically at a temperature between about 100° and about 400° C., it can be sulfided if desired. This can be accomplished at a temperature between about 100°–800° C., preferably between about 200° and about 400° C., and at a pressure between 0 and about 150 atmospheres, preferably between about 0 and about 100 atmospheres. The sulfiding can last from less than one hour to more than 24 hours with a typical sulfiding time of between about 0.5 and about 2 hours. Hydrogen sulfide is a preferred sulfiding agent but others, such the various mercaptans (e.g. methyl mercaptan), can be used. The sulfiding can be done either neat or diluted, e.g. with such diluents as carbon monoxide, and it can be done before, after or during the reduction step with hydrogen (if such a step is employed). If done with a reduction step, the hydrogen sulfide:hydrogen mole ratio can vary widely, typically between 50:1 and 1:50.

The catalyst compositions can also be sulfided in situ with the feed and/or product stream of the process. This stream can produce a catalyst having sulfur as a component but the exact amount of sulfur in the catalyst is difficult to determine and is subject to change over the course of the reaction.

Reaction

As stated earlier, the reaction of carbon monoxide with hydrogen sulfide to form carbonyl sulfide and hydrogen is a known vapor phase reaction and is described in such references as U.S. Pat. No. 3,856,925 and Fukuda et al., Journal of Catalysis, 49, 379 (1977). The reaction is typically conducted within a temperature range of 50°–800° C., preferably 300°–500° C., and within a pressure range of 0–500 psig, preferably 0–300 psig. Stoichiometric amounts of reactants are required although preferably an excess of hydrogen sulfide is present as a means of shifting the equilibrium to the right. The reaction can be conducted in any vapor phase reactor including the various fixed-/and fluid-bed configurations and the contact time of the reactants over the catalyst bed will vary with the other process parameters. Typically a contact time of about 1 to about 20 seconds, preferably 2 to about 10 seconds is employed in a fixed-bed reactor. The catalysts of this invention can be used alone, in combination with one another and/or in combination with other catalysts.

The products of this process are hydrogen, carbonyl sulfide and minor amounts of other compounds, primarily methane and carbon dioxide. Hydrogen and carbonyl sulfide are the desired products, the former to be ultimately recovered and the latter a useful intermediate in various thermochemical cycles in which this reaction is but one step.

The following examples are illustrative embodiments of this invention. Unless indicated to the contrary, all parts and percentages are by weight.

Catalyst Preparation

The catalyst of Example 1 in the Table was prepared by the following procedure. The other catalysts reported in this Table were prepared by a similar procedure. All the catalysts were commercially obtained.

One-eighth inch Alundum ® spheres (20 cc, SA-5209 obtained from Norton Company) were wetted with water (2 ml). Cobalt Graphimet ® (1.85 g, 5 percent cobalt in graphite, obtained from the Alfa division of Vistron Corporation) was applied in four equal portions to the wetted spheres. These spheres were rolled on a roller mill in small vials for about 15 minutes between each addition of the catalyst. Approximately 20 cc of the resulting catalyst precursor was then placed in a quartz tube (0.75" internal diameter, catalyst bed 10" long) and held in place with quartz wool plugs. The precursor was then dried at 400° C. under nitrogen for about 30 minutes.

Procedure and Conditions

Unless otherwise noted, the reactions were conducted in the quartz tube used to condition the catalyst precursor as described in the preceding paragraph. Following this pretreatment, a feed of hydrogen sulfide:carbon monoxide was introduced into the tube at a 1:1 molar ratio and at a flow rate that established a 10 second contact time of reactants over the catalyst bed. The off-gas rate was measured with a soap-film meter and the off-gas composition was determined after one hour of on-stream activity with the aid of a Carle 111 gas chromatograph equipped with a 158-b column system. Reject gases were scrubbed in a monoethanolamine/water solution and then vented to the hood. The reaction temperature of each example was approximately 400° C. and the tube was heated by means of a Lindberg tube furnace. The reactant gases were introduced into the tube from tanks through stainless steel tubing, regulators, flow controllers, and rotometers. The gases were purchased from the Matheson Gas Company and used without further purification.

The percent conversion as reported in the Table was calculated by subtracting the amount of hydrogen sulfide leaving the reactor from the amount of hydrogen sulfide fed to the reactor and dividing the difference by the amount of hydrogen sulfide fed to the reactor and then multiplying the quotient by 100. The ratio of hydrogen to carbon dioxide as calculated by simply dividing the hydrogen recovered (in mole percent) by the carbon dioxide recovered (also in mole percent) and reporting the quotient. The higher the quotient, the better the selectivity. Although not reported in the Table, for each mole of hydrogen produced, one mole of carbonyl sulfide was also produced.

TABLE
REACTION OF HYDROGEN AND CARBON MONOXIDE IN THE PRESENCE OF VARIOUS METAL INTERCALATES OF GRAPHITE CATALYSTS

| Example | Catalyst[1] | $H_2S$ Conversion (%) | $H_2/CO_2$ |
|---|---|---|---|
| A | Graphite | None | — |
| 1 | Co Graphimet$^{(R)}$ (5% Co) | 20.4 | 51 |
| 2 | Fe Graphimet$^{(R)}$ (5.5% Fe) | 2.8 | 30 |
| 3 | Ni Graphimet$^{(R)}$ (20% Ni) | 15.6 | 78 |
| 4 | Pd Graphimet$^{(R)}$ (1% Pd) | 21.2 | 106 |
| 5 | Cu Graphimet$^{(R)}$ (5% Cu) | 1.0 | * |

[1]The weight percent of metal in the catalyst reported in the parenthesis below each catalyst entry.
*No $CO_2$ was deducted in the product gas.

As the data in the Table shows, the metal intercalates of this invention produce good conversions of the hydrogen sulfide reactant with a good selectivity to hydrogen. In contrast, graphite alone shows essentially no activity for this reaction.

Although the preceding examples describe this invention in considerable detail, the purpose of this detail is for illustration only and is not to be construed as a limitation upon the invention as described in the specification or following claims.

What is claimed is:

1. A process for the production of hydrogen and carbonyl sulfide, the process comprising contacting gaseous hydrogen sulfide with gaseous carbon monoxide in the presence of a catalytic amount of an intercalate of the formula:

$$M_a C_{100-a} \qquad (I)$$

where
M is at least one of Co, Fe, Ni, Pd, Cu, Mo, W, V, Nb, Ta, Ru, Os, Rh, Ir and Ti;
C is graphite; and
a represents the weight percent of M present in the intercalate and has a value between about 0.1 and 30.

2. The process of claim 1 where M is at least one of palladium, cobalt, nickel, copper and iron.

3. The process of claim 1 where M is at least one of palladium, cobalt and nickel.

4. The process of claim 1 where the value of a is between about 2-20.

5. The process of claim 2 where the value of a is between about 2-20.

6. The process of claim 3 where the value of a is between about 2-20.

7. The process of claim 1 where the intercalate is used in combination with a support.

8. The process of claim 6 where the intercalate is used in combination with a support.

9. The process of claim 7 where the support is an alumina or a silica-alumina.

10. The process of claim 8 where the support is an alumina or a silica-alumina.

11. The process of claim 7 where the intercalate is coated onto the support and is present in an amount of at least about 1 weight percent, based on the combined weight of the support and the intercalate.

12. The process of claim 9 where the intercalate is coated onto the support and is present in an amount of at least about 1 weight percent, based on the combined weight of the support and the intercalate.

13. The process of claim 1 where the hydrogen sulfide and carbon monoxide are contacted at a temperature between about 50°-800° C. and a pressure between about 0-500 psig.

14. The process of claim 4 where the hydrogen sulfide and carbon monoxide are contacted at a temperature between about 50°-800° C. and a pressure between about 0-500 psig.

15. The process of claim 7 where the hydrogen sulfide and carbon monoxide are contacted at a temperature between about 50°-800° C. and a pressure between about 0-500 psig.

16. The process of claim 11 where the hydrogen sulfide and carbon monoxide are contacted at a temperature between about 50°-800° C. and a pressure between about 0-500 psig.

17. The process of claim 13 where the intercalate is present as a fixed-bed and the contact time of the hydrogen sulfide and carbon monoxide with the intercalate is between about 1-20 seconds.

18. The process of claim 14 where the intercalate is present as a fixed-bed and the contact time of the hydrogen sulfide and carbon monoxide with the intercalate is between about 1-20 seconds.

19. The process of claim 15 where the intercalate is present as a fixed-bed and the contact time of the hydrogen sulfide and carbon monoxide with the intercalate is between about 1-20 seconds.

20. The process of claim 16 where the intercalate is present as a fixed-bed and the contact time of the hydrogen sulfide and carbon monoxide with the intercalate is between about 1-20 seconds.

* * * * *